March 30, 1937.  W. C. GEORGE  2,075,192
ROLL HANDLING MECHANISM
Filed May 22, 1935  8 Sheets-Sheet 1
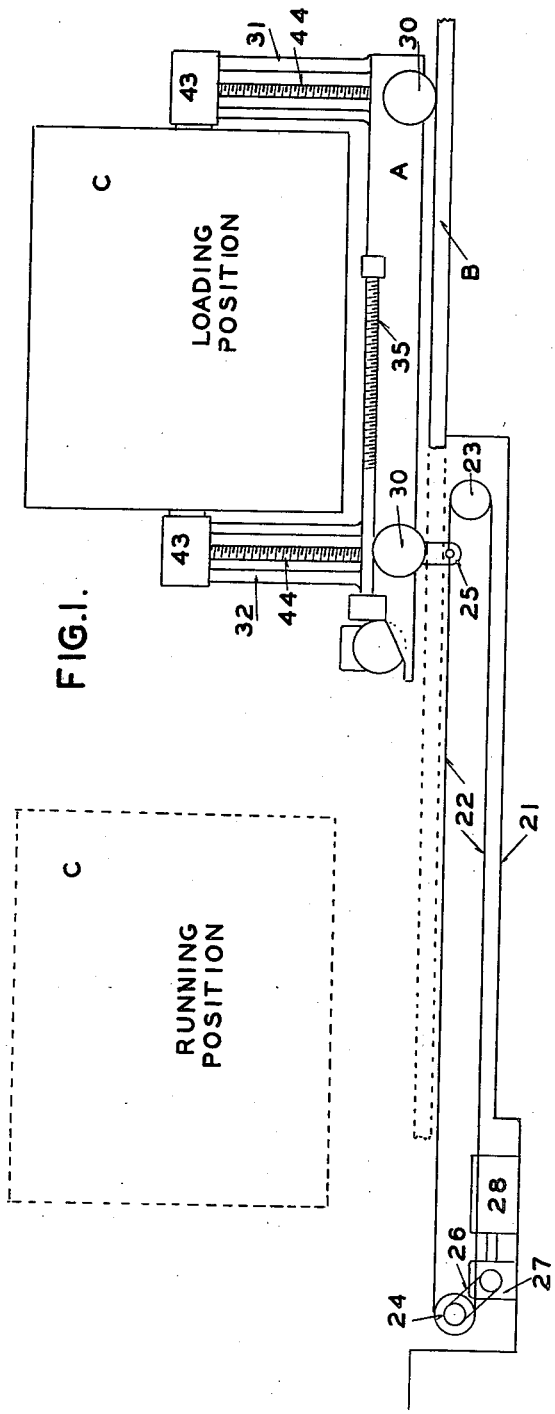
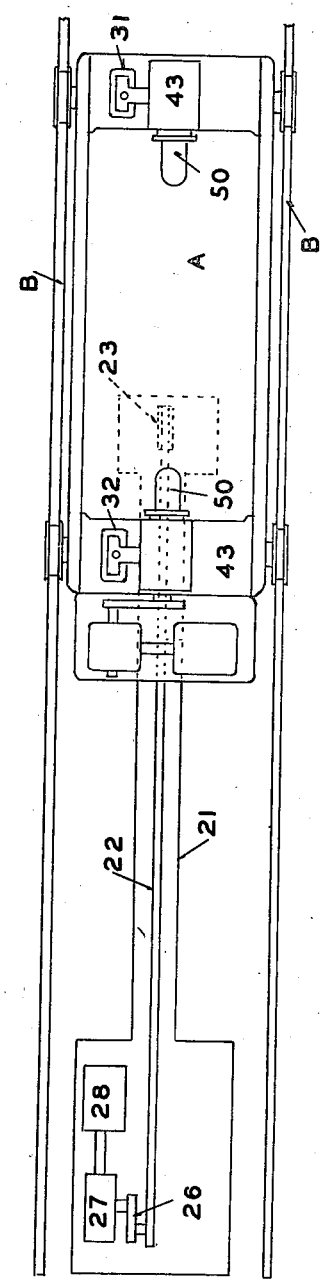
INVENTOR
W. C. GEORGE March 30, 1937.  W. C. GEORGE  2,075,192
ROLL HANDLING MECHANISM
Filed May 22, 1935   8 Sheets-Sheet 2
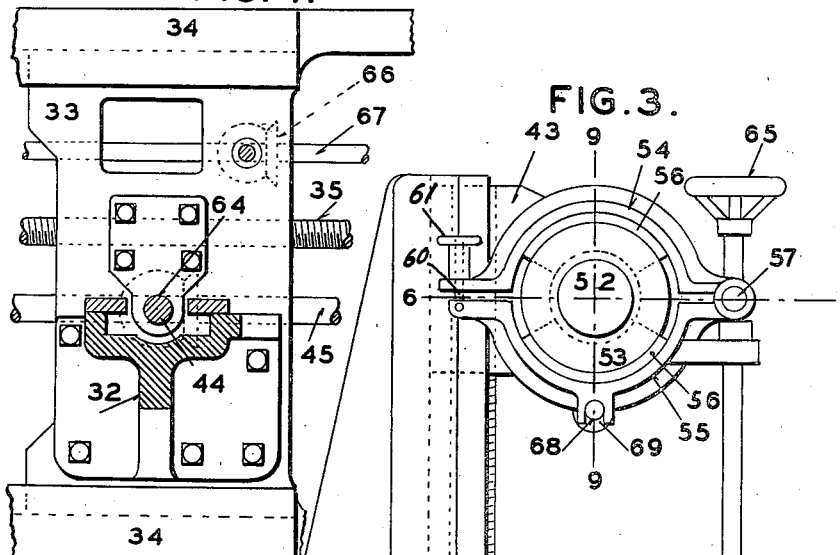
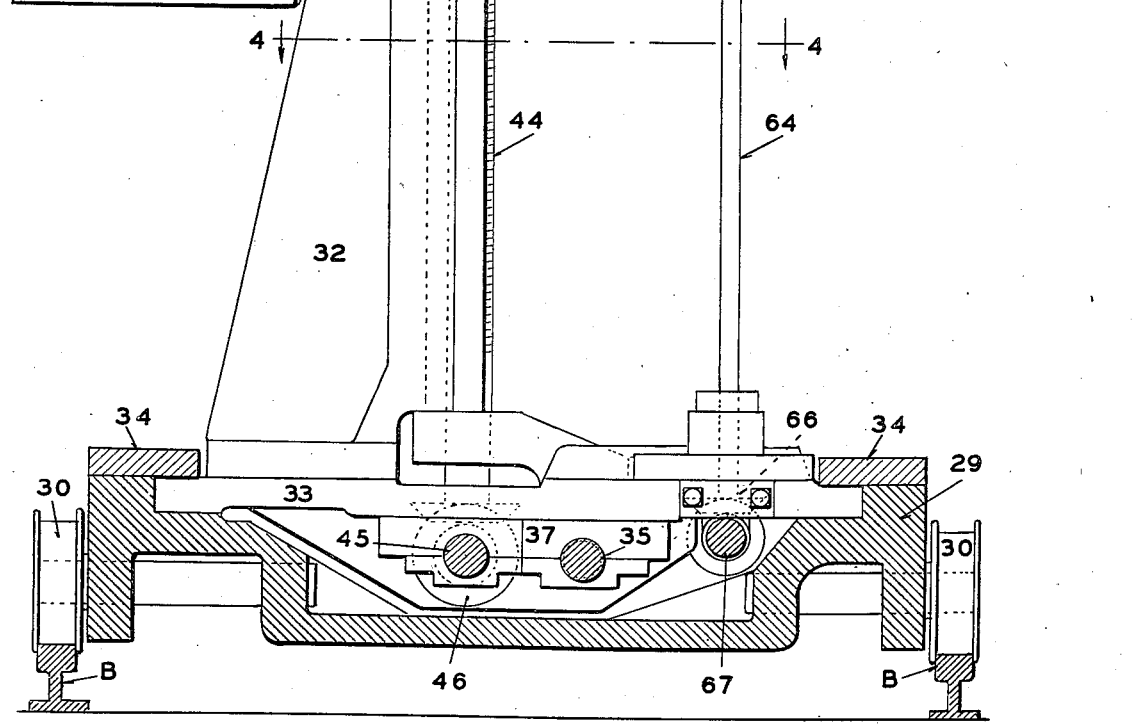
INVENTOR
W.C. GEORGE
BY
ATTORNEY

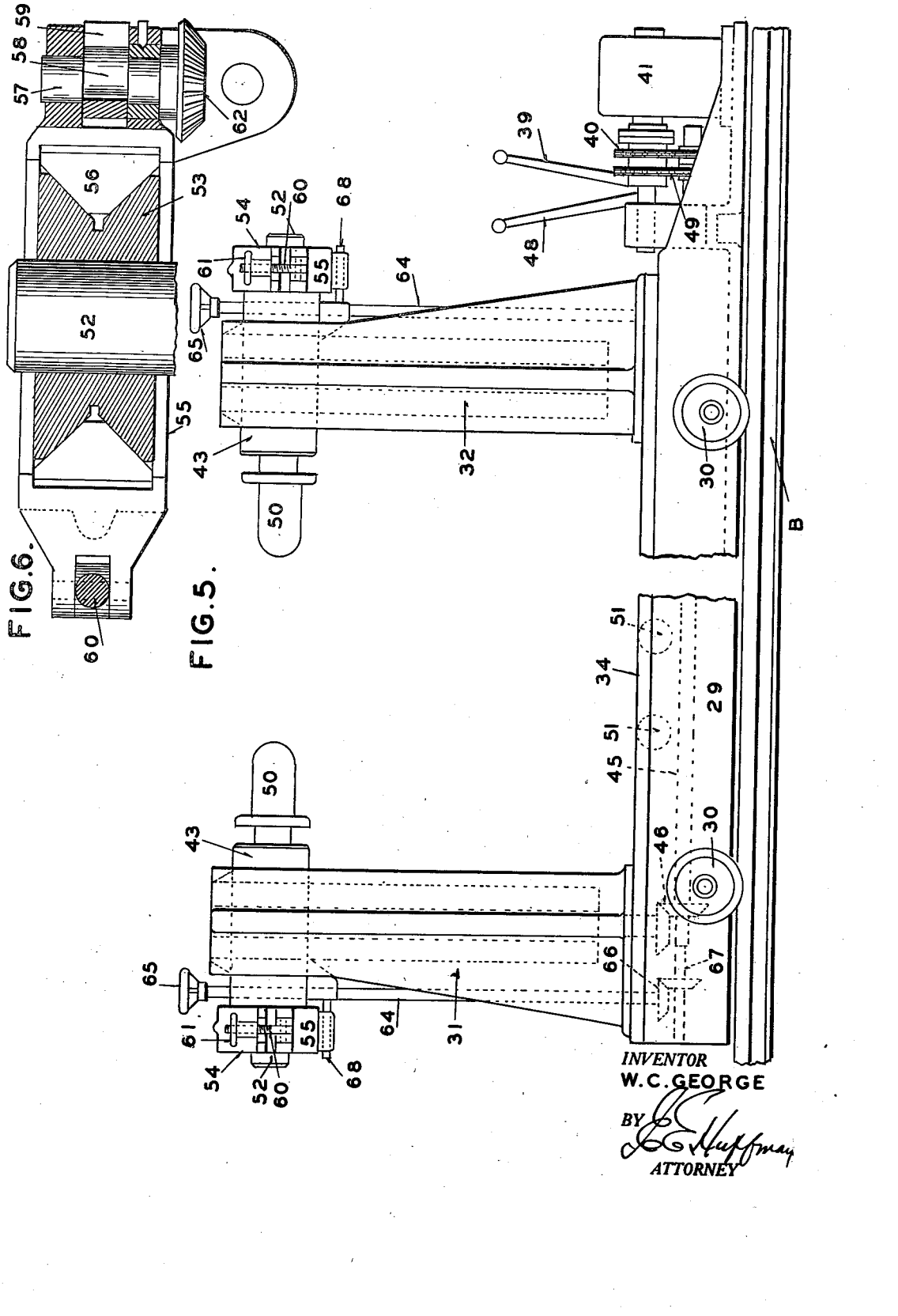

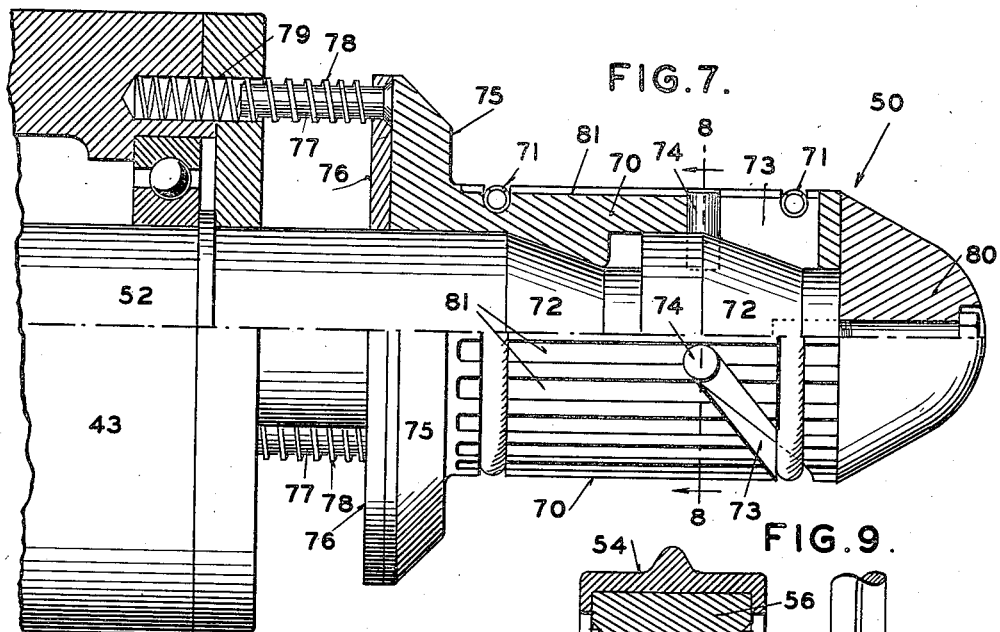
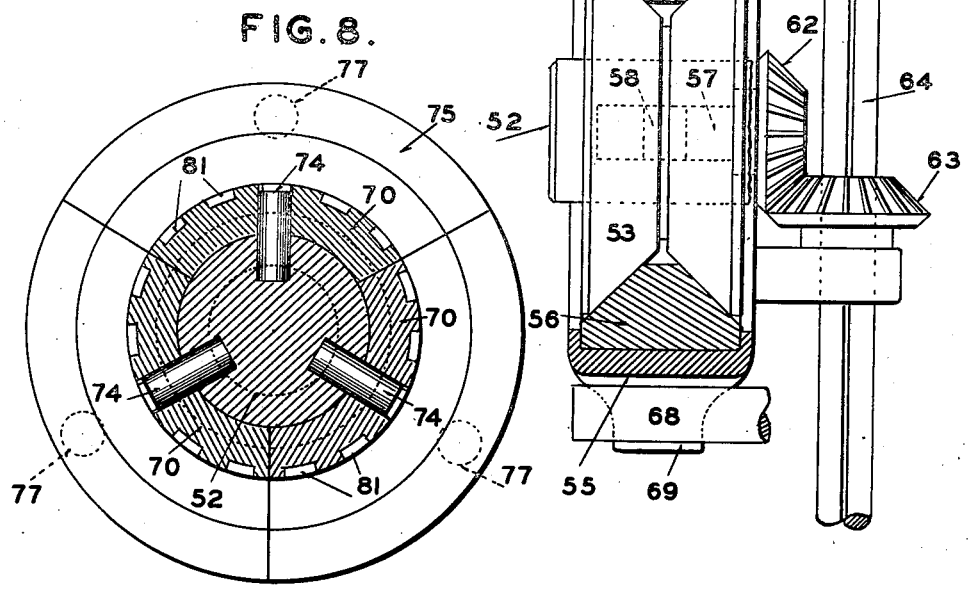

March 30, 1937.  W. C. GEORGE  2,075,192
ROLL HANDLING MECHANISM
Filed May 22, 1935  8 Sheets-Sheet 5
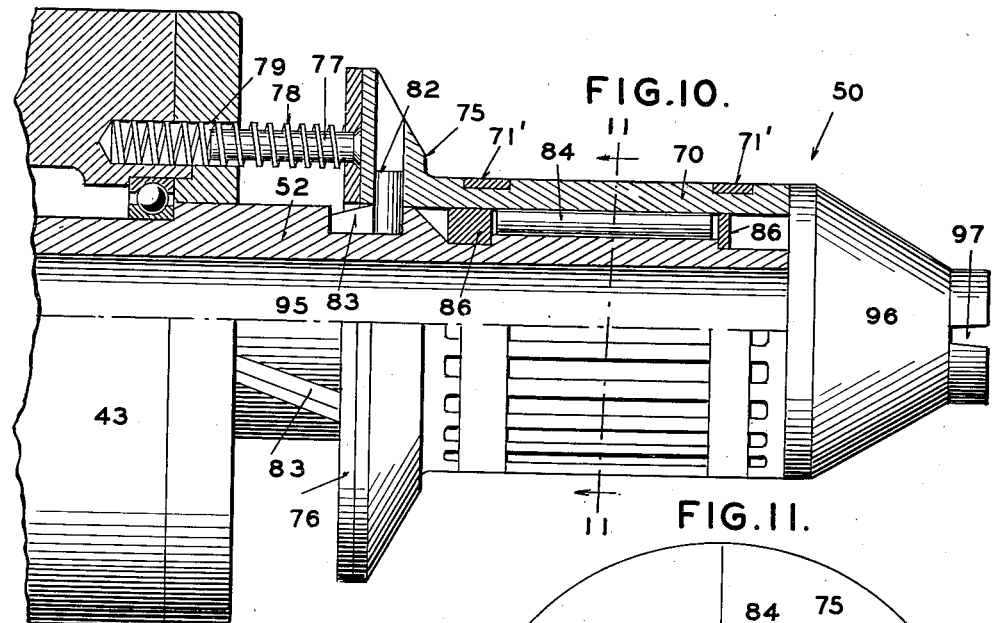
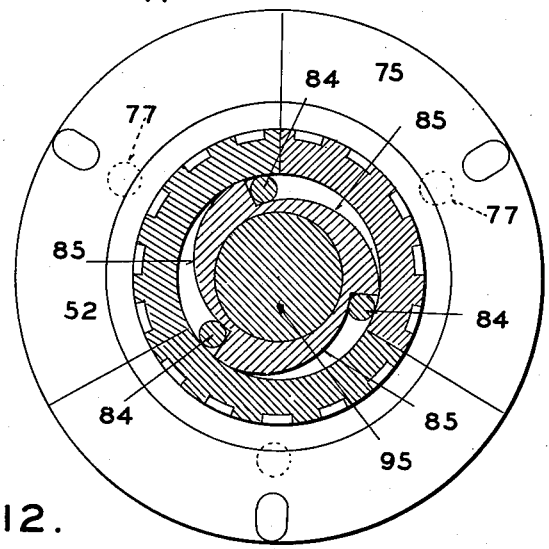
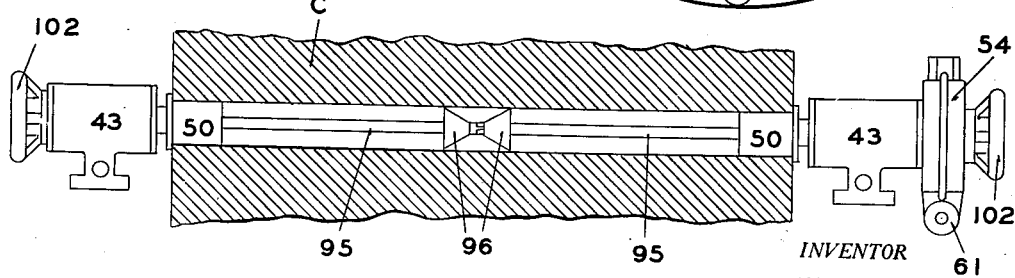
INVENTOR
W. C. GEORGE
BY
ATTORNEY March 30, 1937.   W. C. GEORGE   2,075,192
ROLL HANDLING MECHANISM
Filed May 22, 1935   8 Sheets-Sheet 6
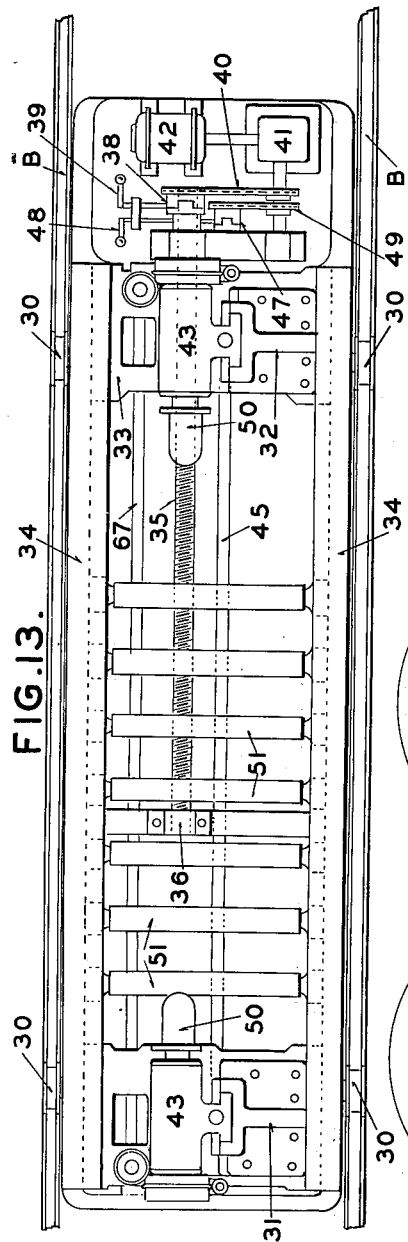
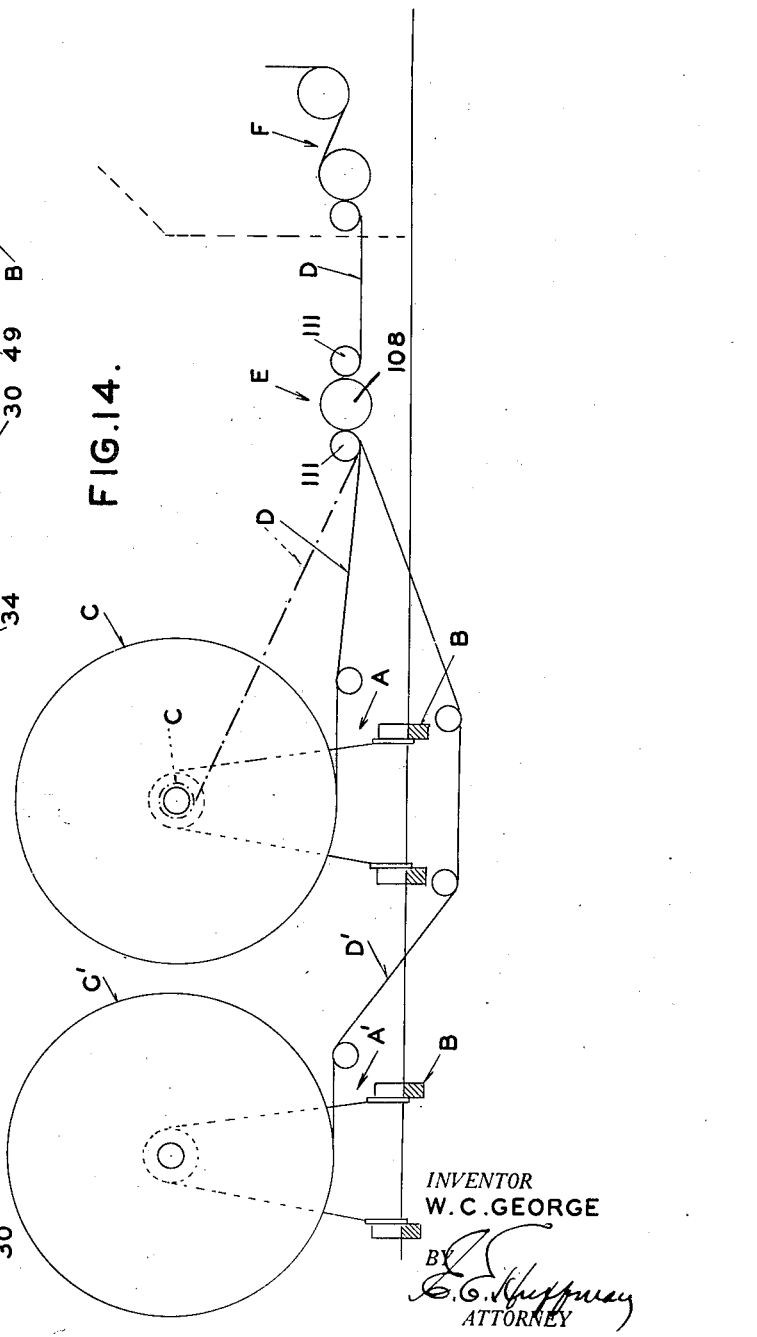
INVENTOR
W. C. GEORGE March 30, 1937.   W. C. GEORGE   2,075,192
ROLL HANDLING MECHANISM
Filed May 22, 1935   8 Sheets-Sheet 7
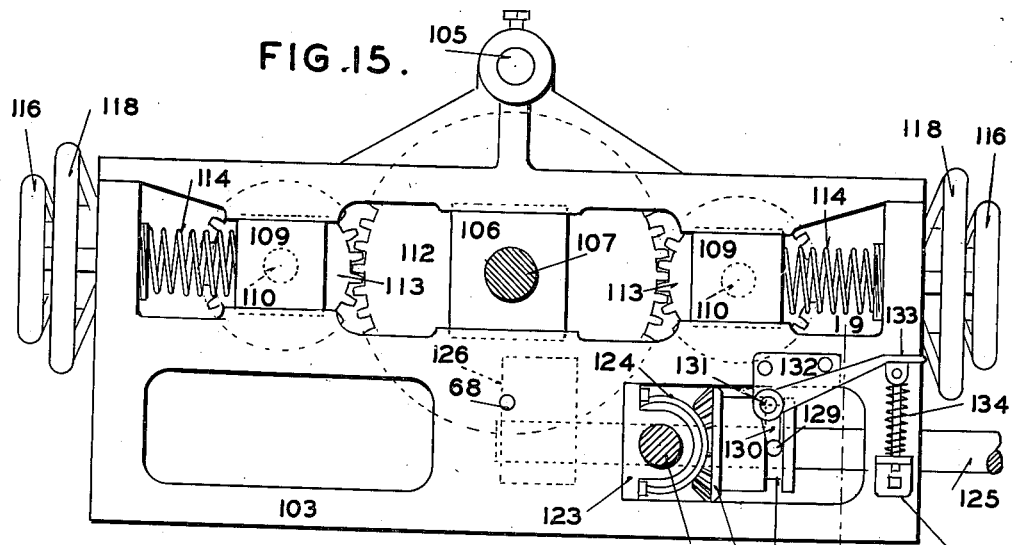
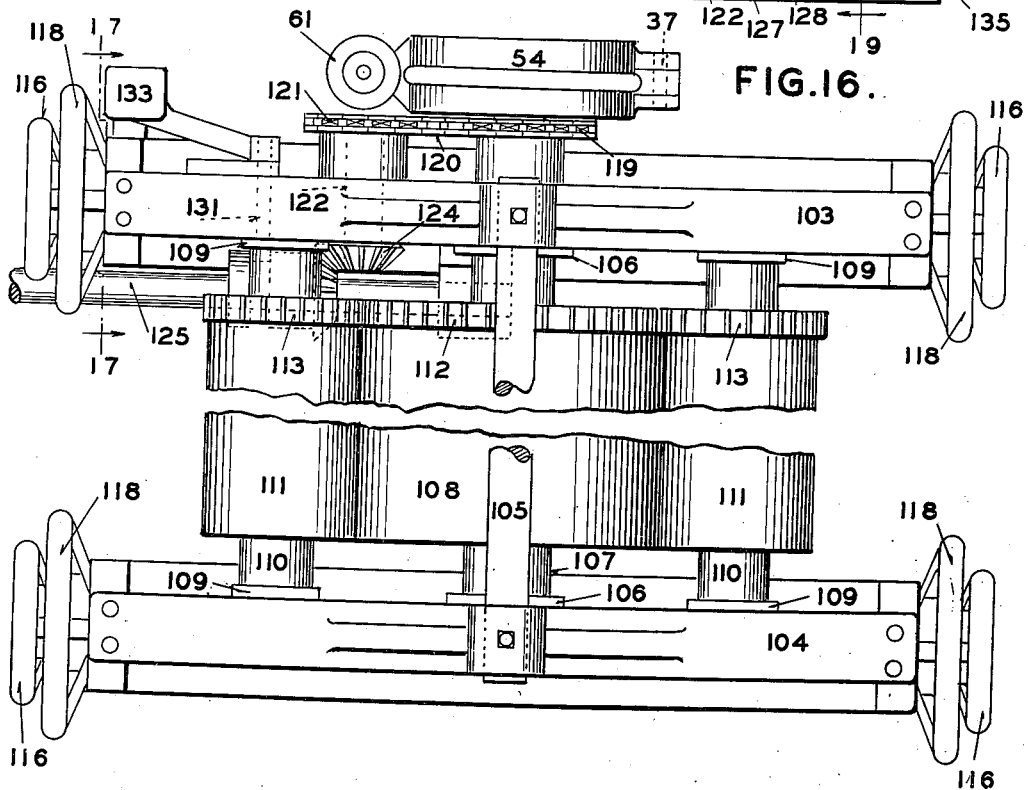
INVENTOR
W. C. GEORGE
BY
ATTORNEY March 30, 1937.  W. C. GEORGE  2,075,192
ROLL HANDLING MECHANISM
Filed May 22, 1935  8 Sheets-Sheet 8
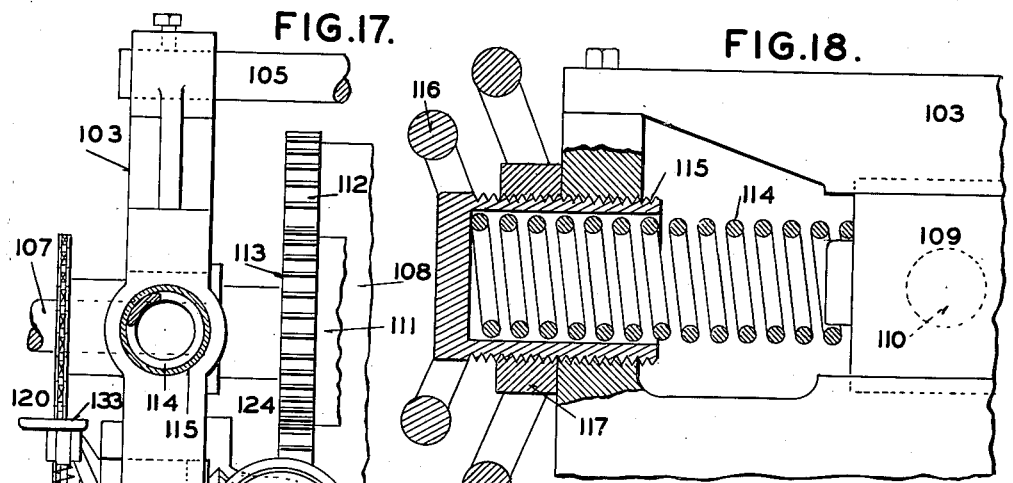
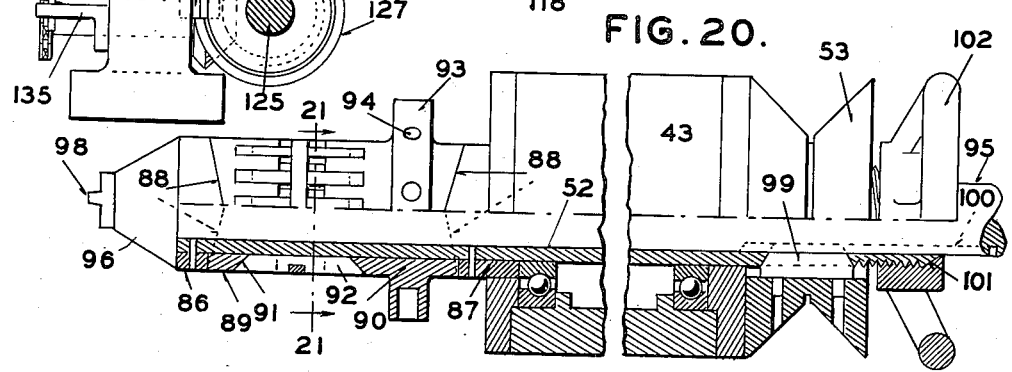
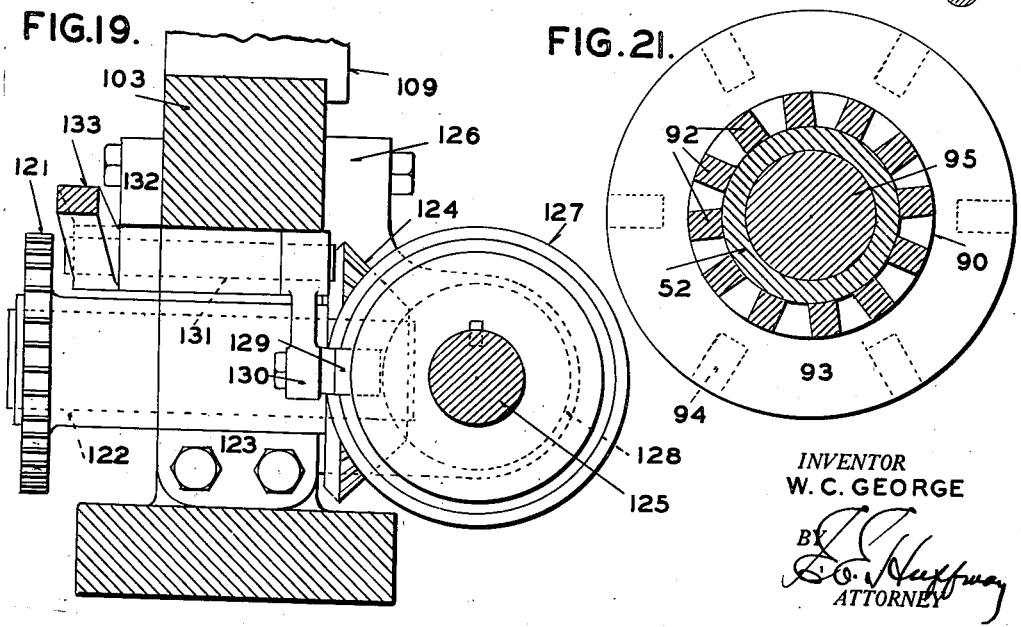
INVENTOR
W. C. GEORGE
ATTORNEY Patented Mar. 30, 1937

2,075,192

UNITED STATES PATENT OFFICE 2,075,192

ROLL HANDLING MECHANISM

Walter C. George, St. Louis, Mo., assignor to Robert Gaylord, Incorporated, St. Louis, Mo., a corporation of Missouri Application May 22, 1935, Serial No. 22,789

7 Claims. (Cl. 242—72)

My invention relates to mechanism for handling rolls of paper for use in connection with machinery for the manufacture of corrugated fiberboard, printing presses, or any other mechanism employing paper in the form of large and heavy rolls.

One object of my invention is to provide an improved roll supporting carriage by means of which a roll may be readily and accurately positioned with relation to the mechanism operating upon the paper, which carriage also provides means for raising the roll into operative position, thus avoiding the use of block and tackle or other cumbersome lifting mechanism.

Another object of my invention is to provide the carriage with roll chucking mechanism which will be automatic or semi-automatic in operation, thus not only facilitating the chucking operation but also insuring the proper engagement of the chucks with the roll during running conditions.

A further object of my invention is to provide the roll with improved braking means which will operate to retard both ends of the roll simultaneously and thus avoid skewing action on the roll when the brake is applied.

Still another object of my invention is to provide means for splicing the end of one roll to that of another, thus rendering the operation substantially continuous, the splicing mechanism also providing compensating means for securing true running of the sheet or web which might otherwise be interfered with by inequalities of the roll and which will also provide tension regulating means for the web.

In the accompanying drawings, which illustrate roll handling mechanism made in accordance with my invention, Figure 1 is a semi-diagrammatic elevation of the carriage; Figure 2 is a semi-diagrammatic plan view of the carriage; Figure 3 is an end of the carriage, partly in elevation and partly in section; Figure 4 is a horizontal section taken on the line 4—4 of Figure 3; Figure 5 is a side elevation of the carriage; Figure 6 is an enlarged section of one of the brakes taken on the line 6—6 of Figure 3; Figure 7 is a side view, partly in section and partly in elevation, of one form of roll chuck; Figure 8 is a section taken on the line 8—8 of Figure 7; Figure 9 is an enlarged section of one of the brakes taken on the line 9—9 of Figure 3; Figure 10 is a side view, partly in section and partly in elevation, of another form of roll chuck; Figure 11 is a section taken on the line 11—11 of Figure 10; Figure 12 is a semi-diagrammatic view showing means for retarding both ends of the roll by the use of a single brake; Figure 13 is a top plan view of the carriage; Figure 14 is a diagram showing the relative arrangement of the parts of the mechanism; Figure 15 is an end view of the splicing mechanism, the brake and sprocket drive being omitted; Figure 16 is a top plan view of the splicing mechanism; Figure 17 is a section taken on the line 17—17 of Figure 16; Figure 18 is an enlarged detail view, partly in section and partly in elevation, showing the spring adjustment of the splicing mechanism; Figure 19 is an enlarged section taken on the line 19—19 of Figure 15; Figure 20 is a side view, partly in section and partly in elevation, showing a third form of roll chuck; and Figure 21 is an enlarged section taken on the line 21—21 of Figure 20.

Referring first to the diagram Figure 14, the mechanism comprises a pair of carriages indicated at A and A' which may be brought into tandem relation but each of which may be moved independently into lateral or loading position on tracks B to receive their respective paper rolls C and C'. The webs D and D' from these rolls, pass first through the splicing and aligning device E and thence to the mechanism F, for example, a corrugating machine where the paper is used. It will be understood, however, that only one of the webs D or D' is in use except at the time of transfer from one roll to another. For example, if the roll C is first brought into operative position, the web D only will be used until the end of the roll is reached, as indicated by broken lines, when the web D' from the roll C', which in the meantime has been loaded and brought into operative position, is led to the splicing device E and secured to the end of the web D. This renders the operation of the mechanism F utilizing the web, substantially continuous.

In semi-diagrammatic Figures 1 and 2 I have shown means for moving the carriage from loading to running position. In this arrangement a pit 21 is provided below and between the rails of the track B, in which pit is an endless cable 22. The cable is supported on pulleys 23 and 24, the latter of which furnishes driving power to the cable which is attached at 25 to a downward projection of the carriage. Pulley 24 is driven by a belt 26 from a reducer 27 actuated by motor 28. This form of carriage moving mechanism is merely illustrative as various other forms may be employed or the carriage may be moved by hand.

Referring next to Figures 3, 4, 5, and 13, the carriage comprises a base 29 provided with wheels 30 running on track B and a pair of pedestals 31 and 32. These pedestals are similar except that they are of right and left hand construction, and that pedestal 31 is fixed to the base, while pedestal 32 has sliding engagement therewith. This sliding engagement is secured by means of a plate 33 resting on ways in the base and held in position by guard rails 34. A threaded rod 35, which may be termed the chucking screw, has its inner end mounted in bearing 36 (Figure 13) and is in threaded engagement with a bearing block 37 on the under face of plate 33. This screw is driven through clutch 38 controlled by lever 39. The clutch is driven by sprocket chain 40 from a reducer 41 actuated by a reversible motor 42. Slidingly mounted on each of the pedestals is a block 43 raised and lowered by means of a lift-screw 44. The two lift-screws are simultaneously actuated to raise or lower the blocks 43 by means of a longitudinal shaft 45 connected to said screw by bevel gearing 46. The shaft 45 is driven through a clutch 47 controlled by lever 48. The clutch 47 is driven by a sprocket chain 49 from the reducer 41. Mounted in each of the blocks 43 is a roll chuck, designated in the general views by the numeral 50, specific forms of which are hereinafter described in detail. To permit easy longitudinal movement of the roll when its bore is being engaged by the roll chucks, the base 29 is provided with a friction reducing support, preferably formed of a number of transverse rollers 51.

Secured to the outer end of the spindle 52 of each roll chuck is a drum 53 having a V-shaped groove in its periphery and forming the inner part of a friction brake, shown in detail in Figures 3, 6, and 9. The outer part of the brake comprises two semi-annular members 54 and 55 carrying the brake shoes 56. The parts 54 and 55 are pivoted together by a stud 57 provided with an eccentric part 58 working in a slot 59 in the member 54. At the opposite side of the brake a threaded rod 60 is pivotally attached to the part 55 and after passing through a slot in the part 54 is engaged by an internally-threaded hand-wheel 61 by means of which the parts 54 and 55 are adjusted toward or away from each other. On the end of the stud 57 is a bevel gear wheel 62 meshing with a wheel 63 keyed to a rod 64 so as to rotate therewith but to slide longitudinally thereof. On the upper end of rod 64 is a hand-wheel 65. The lower end of each of the rods 64 is connected by bevel gearing 66 to a rod 67 so that when one of the rods 64 is actuated through its hand-wheel 65 to tighten or loosen the brake at one end of the paper roll, the other rod 64 will be actuated to simultaneously tighten or loosen the brake at the other end of the roll. A pin 68 carried by the block 43 engages with a slot 69 in the member 55 to anchor the outer member of the brake against rotation.

In Figures 7 and 8 I have shown one form of roll chuck which is automatic in operation. In this construction the spindle 52 is surrounded by an expansible sleeve formed of segments 70. As shown in the drawings these segments are three in number. The number, however, may be varied. The segments are held in position by suitable elastic means, such as coil springs 71 lying in peripheral grooves in the sleeve. The spindle is provided with a pair of conical faces 72 contacting with corresponding conical faces on the interior of the sleeve. Each segment is also provided with an inclined slot 73 engaging with a pin 74 carried by the spindle. Each segment of the sleeve is provided, at the end adjacent the block 43, with an outwardly projecting part, which parts form a flange 75. This flange bears against a ring 76 provided with studs 77. These studs are surrounded by coil springs 78 and are adapted to telescope with openings 79 in the inner face of block 43. The spindle is provided with an end piece 80, approximately conical in shape, which provides guiding means when the chuck enters the bore of the paper roll. The periphery of the sleeve is provided with flutes 81 or is otherwise roughened to secure good driving contact between the sleeve and the wall of the paper roll bore.

When the form of chuck shown in Figures 7 and 8 is engaged with a paper roll, the end of the roll contacts with the flange 75 forcing the sleeve toward the block 43 against the tension of springs 78. The result of this movement is that the action of the conical faces 72 of the spindle on the corresponding faces of the sleeve forces the segments outwardly, thus expanding the sleeve firmly against the bore of the roll. At the same time the action of the pins 74 on the inclined slots 73, causes relative rotation of the sleeve and spindle. Under running conditions the tendency is to continue the latter movement and so force the sleeve further toward the block 43 and further expand the sleeve. The operation of the chuck is, therefore, fully automatic both as to the initial engagement of the chuck with the roll and the insuring of such engagement during running conditions.

In Figures 10 and 11 I have shown a modified form of automatic roll chuck. In this modification the relative rotary movement between the sleeve and the spindle is secured by pins 82 carried by the flange 75 and projecting into inclined grooves 83 in the spindle. The resultant outward movement of the segments of the sleeve is caused by rollers 84 cooperating with cam faces 85 formed on the spindle. Longitudinal movement of the rollers with respect to the spindle is prevented by stop rings 86. In this construction elastic bands 71' are used to retain the segments of the sleeve in place of the coil springs 71.

The operation of this form of chuck, while secured by somewhat different means, is substantially the same as that of the chuck above described. When the sleeve is forced toward block 43 by the engagement of the flange with the end of the paper roll, the movement of the pins 82 in slots 83 rotates the sleeve relative to the spindle so that the action of cam faces 85 on rollers 84 expands the segments of the chuck firmly into contact with the roll while the action of the running roll tends to continue this movement and so maintains firm contact.

In Figures 20 and 21 I have shown a third form of chuck which is semi-automatic in operation. In this construction the spindle has secured to it two collars 86 and 87 each provided with oppositely inclined end faces 88 cooperating with correspondingly shaped end faces on sleeve members 89 and 90. These sleeve members are each provided with recesses having inclined ends 91, in which recesses are expansion bars 92 having correspondingly inclined ends. Formed on sleeve member 90 is a flange 93 having openings 94 in its periphery for the reception of an operating tool.

When this form of chuck is used, the chuck, after entering the bore of the paper roll must be initially expanded by rotating the chuck elements. This is accomplished by inserting a suitable tool in the holes 94 in the periphery of the flange. Rotation of the sleeve members causes the inclined faces 88 to force said members toward each other which, through the action of inclined faces 91 expands bars 92 against the paper roll. During running operation the tendency is to turn the sleeve members further and so automatically maintain firm contact between the roll and the chuck.

In the form of chuck shown in Figures 10 and 11, as well as that shown in Figures 20 and 21, I have illustrated the spindles as being hollow to receive a coupling shaft 95 provided with a conical end 96. The end of the shaft 95 of one chuck is provided with a slot 97 (Figure 10) and that of the opposing chuck with a corresponding projection 98 (Figure 20) so that when the two ends are brought into engagement in the center of the paper roll, as shown in Figure 12, an interlock between the two shafts will result. When these coupling shafts are used, only one brake is necessary. The drum 53 of this brake is secured to the spindle by a key 99 passing through a slot in the spindle and engaging a keyway 100 in the shaft 95 (Figure 20). The brake drum, spindle, and shaft are thus held against relative rotary movement while the shaft may be moved longitudinally in the spindle. To provide means for locking the shaft against longitudinal movement, the end of the spindle is threaded, split, and provided with an inclined face 101 adapted to be engaged by a corresponding inclined face on the internally threaded hub of a locking wheel 102. The construction at the other end is the same except that the brake drum is omitted. The shaft need not, therefore, be provided with a key-way. Also, the pin 57 pivoting the parts 54 and 55 of the brake together is not provided with the eccentric part 58, the handwheel 61 alone being used to control the brake. As the pin 57 is not rotated, the driving mechanism therefor, including shafts 64 and 67 and the bevel gears 62, 63, and 66, are also omitted.

When this construction is used the locking wheels 102 at both ends of the carriage are loosened and the coupling shafts 95 drawn out until their ends 96 abut against the ends of the chuck as shown in Figures 10 and 20. After the chucks have been inserted in the paper roll, the shafts are moved inwardly until their ends 96 interlock at the center of the roll, as shown in Figure 12. The retarding effect of the single brake is thus communicated simultaneously to both chucks and the same result secured as when two brakes with connecting gearing are employed. While I have shown the coupling shafts and single brake used in connection with the forms of chuck shown in Figures 10, 11, 20, and 21 and not in connection with the forms illustrated in Figures 7 and 8, I wish it to be understood that this construction may be used in connection with the latter named form also. And further, that the double brake and connecting gearing may be substituted for the coupling shafts in the first named forms.

In Figures 15 to 19 I have shown the splicing mechanism comprising a pair of similar side frames 103 and 104 connected by a tie rod 105. Slidingly mounted in each of the frames is a bearing block 106 in which is journaled shaft 107 of the main splicing roll 108. Each frame has slidingly mounted in it at each side of the block 106 a bearing block 109 in which are journaled shafts 110 of the side rolls 111. The roll 108 is provided at one end with a gear wheel 112 meshing with gear wheels 113 on rolls 111 so that the three rolls are positively driven at the same peripheral speed. The bearing blocks 109 are biased toward the main roll by coil springs 114 the ends of which extend into sleeves 115 having threaded engagement with the frame and provided with hand wheels 116 by means of which they may be rotated to vary the tension of the springs. After adjustment of the spring tension the sleeves are secured against rotation by lock nuts 117 actuated by means of hand wheels 118.

The shaft 107 of the main roll extends beyond the frame 103 and is provided with a sprocket wheel 119 connected by sprocket chain 120 with a sprocket wheel 121 on the outer end of a stud 122. This stud is journaled in a bracket 123 and has mounted on its inner end a bevel gear wheel 124. A driving shaft 125, having its inner end mounted in a bearing 126, is provided with a sliding gear 127. Formed in the hub of this gear is an annular groove 128 engaging with a pin 129 carried by an arm 130. The arm 130 is mounted on a rock shaft 131 journaled in a bracket 132. A treadle 133 carried on the outer end of the rock shaft is normally held in raised position by a coil spring 134 interposed between the treadle and a bracket 135. While the treadle is held in raised position by the spring, gear wheel 127 will be held out of mesh with wheel 124 so that the rolls will either remain idle or be driven by the friction of the web passing between them. When, however, the treadle is depressed, gear 127 will be moved into mesh with gear 124 so that the rolls will be positively driven from shaft 125 supplied with power from any suitable source. On the end of shaft 107 is a brake for retarding the rolls of the splicer. This brake may be like that described in connection with the roll chucks. It is desirable that the tension on the web passing to the machine F be maintained constant throughout the operation of the machine. While a uniform retarding effect may be imparted to the chucks by their braking mechanisms, the tension of the web will vary due to the changing diameter of the roll as it unwinds. By the use of the brake on the splicer rolls, uniform tension may be maintained on the portion of the web between the splicer and the machine F.

The operation of my roll handling mechanism is briefly as follows: One of the carriages, for example carriage A, is moved out into loading position and roll C positioned on the bed rollers 51. Clutch 47 is now thrown into operation to actuate shaft 45 which, through gearing 46, simultaneously actuates the lifting screws 44 to raise or lower the blocks 43 as required until the chucks 50 are brought into alignment with the bore of the roll C. Clutch 47 is now disengaged and clutch 38 engaged by means of lever 39, the motor 42 being driven in the proper direction to move pedestal 32 toward pedestal 31 through the action of chucking screw 35. This will first cause the chuck of pedestal 32 to enter the bore of the roll and then move the roll longitudinally on the bed of the carriage to cause the chuck of pedestal 31 to engage the bore of the roll. After proper engagement of the chucks with the roll, clutch 38 is disengaged and clutch 47 again engaged, the motor being driven in the proper direction to raise blocks 43 and thus lift the roll from the bed of the carriage. The carriage is now moved into running position, the web D being led under the first roll 111 of the splicer over roll 108, under the second roll 111 and thence to the corrugator F or other paper using machine. During the running of the machine any tendency of the web to run untrue due to inequalities of the roll, may be counteracted by varying the tension of one or more of the springs 114 by means of the hand wheels 116. This will move the sliding bearings 106 and 109 to slightly cant the rolls in the proper direction to correct the untrue running. During the operation of the machine the roll must be retarded or it will overrun due to its momentum. As has been previously pointed out, this retardation will be simultaneously applied to both ends of the roll whether a double brake or a single brake and coupling shaft construction is employed.

When the end of web D of roll C is reached, paste is applied to the leading edge of web D' of roll C' which has previously been loaded and brought into running position. The web is then brought up to roll 111 of the splicing device. As tension is applied to web D by means of the brake on roll 108, the retarding effect on roll C is released. The spring pressure of roll 111 presses web D' into web D, thus setting the paste. To take the strain off the pasted splice, the brake on roll 108 is released and the clutch treadle 133 is depressed to positively drive the pasting rolls at the same surface speed as the machine being supplied with paper. As soon as the splice enters the machine F the treadle is released and tension applied to rolls C' and 108 in the usual manner.

Having fully described my invention, what I claim as new and desire to secure by Letters Patent of the United States is:

1. In a device of the class described, the combination with a base, of a pair of pedestals carried thereby, an expansible paper roll chuck mounted in each pedestal, roll retarding means, said means including a brake for one of the chucks, and a coupling rod slidingly mounted in one of the chucks for transmitting braking action through the roll to the opposite chuck.

2. In a device of the class described, the combination with a base, of a pair of pedestals carried thereby, an expansible paper roll chuck mounted in each pedestal, roll retarding means, said means including a brake for one of the chucks, and sliding coupling rods extending through the chucks, said rods interlocking within the paper roll.

3. In a device of the class described, the combination with a base, of a pair of pedestals carried thereby, a paper roll chuck rotatably mounted in each pedestal, a coupling rod slidingly mounted in each chuck, said rods interlocking within the paper roll, a brake member for one of said chucks, means for locking the brake member to the chuck and coupling rod to prevent relative rotation of said parts, and means for locking each coupling rod against longitudinal movement in its chuck.

4. In a device of the class described, the combination with a base, of a pair of pedestals carried thereby, a paper roll chuck for each pedestal, each chuck being provided with a sleeve, a coupling rod extending through each sleeve, said rods interlocking within the paper roll, a brake member non-rotatably mounted on one of said sleeves, said sleeve being split, the coupling rod in said latter named sleeve being keyed thereto, and a nut on said split sleeve to lock the rod against longitudinal movement therein.

5. A paper roll chuck comprising a support, a spindle mounted in said support, a sleeve formed of a plurality of segments having sliding movement on said spindle, said sleeve also having rotary movement relative to the spindle, and a flange on the sleeve engaging with a paper roll to cause both sliding and rotary movement of the sleeve.

6. A paper roll chuck comprising a support, a spindle mounted in said support, a sleeve formed of a plurality of segments having sliding movement on said spindle, a plurality of cam faces on the spindle, rollers cooperating with said faces to expand the sleeve, inclined slots in the spindle, and pins in the segments engaging said slots.

7. A paper roll chuck comprising a support, a spindle mounted in said support, a sleeve on said spindle, said sleeve including a plurality of radially movable gripping members, said members having limited rotary movement relative to the spindle, and means for imparting longitudinal movement to a portion at least of the sleeve, the combined rotary and longitudinal movement functioning to expand the gripping members against the interior of a paper roll.

WALTER C. GEORGE.